United States Patent [19]

Buchanan

[11] 4,260,286
[45] Apr. 7, 1981

[54] INTEGRATED FISH MIGRATION SYSTEM
[76] Inventor: Robert R. Buchanan, 340 Rosewood Ave., San Jose, Calif. 95117
[21] Appl. No.: 31,625
[22] Filed: Apr. 19, 1979
[51] Int. Cl.$^3$ .............................................. E02B 8/08
[52] U.S. Cl. ......................................... 405/82; 405/81
[58] Field of Search ...................... 405/81, 82, 83, 84, 405/43, 45

[56] References Cited
U.S. PATENT DOCUMENTS

| 769,910 | 9/1904 | Melbye | 405/83 |
|---|---|---|---|
| 1,573,785 | 2/1926 | Albright | 405/82 |
| 2,763,991 | 9/1956 | Kennon | 405/43 |
| 3,338,056 | 8/1967 | Roscoe | 405/82 |

FOREIGN PATENT DOCUMENTS 60197  2/1891  Fed. Rep. of Germany ............. 405/81

Primary Examiner—Dennis L. Taylor
Attorney, Agent, or Firm—David A. Boone; Allston L. Jones

[57] ABSTRACT

A system for use at dams, diversion canals, and the like includes a fish ladder for enabling fish to travel both upstream and downstream without injury past man-made obstacles such as dams. The fish ladder comprises a series of dish-like compartments to which water is made to flow from top to bottom. Auxiliary water input to each dish in the series is maintained to create the desired turbulence and flush debris from the ladder. Also included is a power predator seine chamber at the bottom of the fish ladder for chumming predator fish from the waters at the bottom of the fish ladder. The predator fish can be sorted out when the seine is raised. Repetitive traveling screens move through the water and allow the removal of water from a body of water without removing or damaging fish therein. The screen's rotation, size of the screen material, and the angle of the screen to primary water flow allow the migrating fish to keep moving in the desired direction while large volumes of water are diverted. Another component of the system is a multi-point discharger for providing water discharge from a dam or the like. The discharger includes a large pipe with numerous small openings for discharging the water as a multitude of small streams of water. The resulting discharge eliminates the confusion in upstream migrants which results from present water discharge systems. The upstream migrating fish are thus more quickly and easily able to find the fish ladder. Also, an optional fish return is provided for those situations where two rivers having migrating fish therein are coupled together by a canal.

12 Claims, 10 Drawing Figures

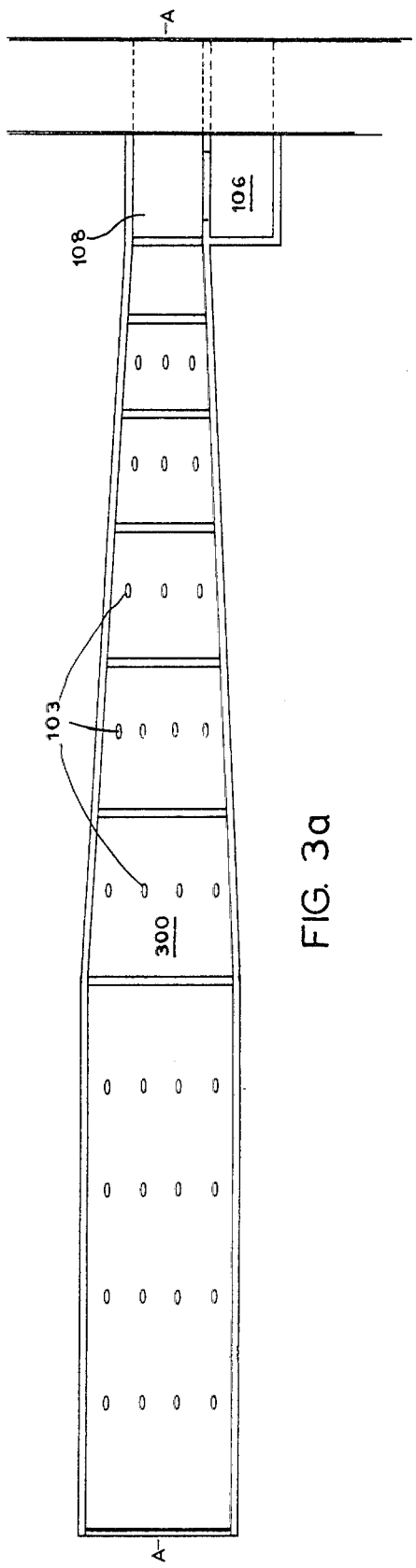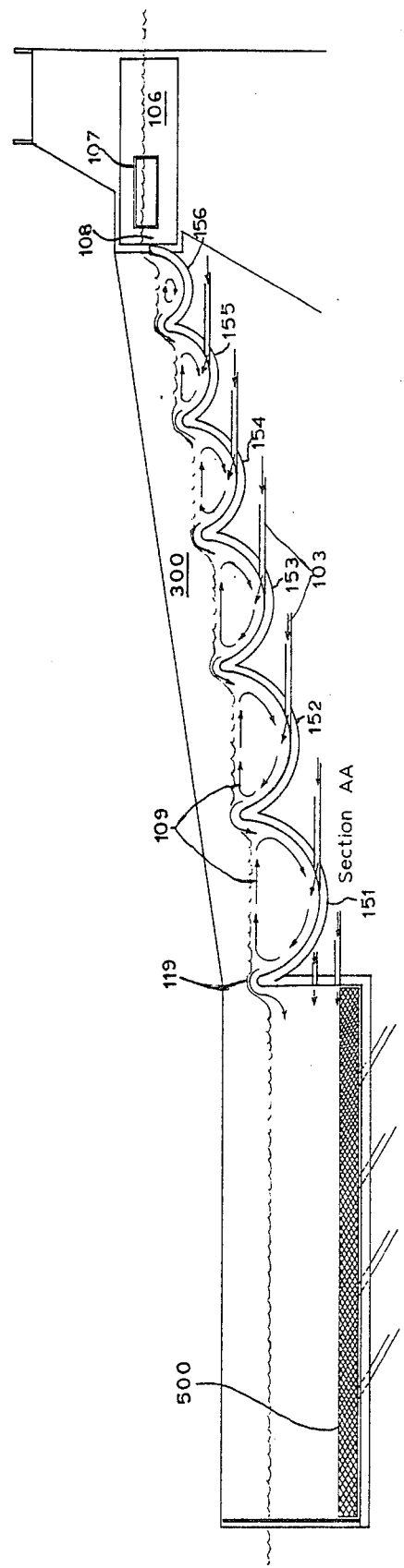
FIG. 3a
FIG. 3b

Section AA

Section BB

INTEGRATED FISH MIGRATION SYSTEM

BACKGROUND AND SUMMARY OF THE INVENTION

Increasingly, natural waterways in the world have been utilized for hydroelectric power and tapped as fresh water sources for residential, industrial, and agricultural use. The use of this water for these purposes has severely interfered with the natural ecology of these waters and has threatened the survival of migratory fish such as salmon and trout.

Some of these problems that have been created include the fact that the upward and downward migration of fish are blocked by structures such as dams and hydroelectric installations. Various apparatus and structures have been improvised to provide a pathway around these installations for migrating fish. However, the pressure upon the fish as they are discharged downstream in the previous systems gives them embolisms and leaves them highly susceptible to predators. Also, the upward migrating fish are confused due to their natural instinct to follow the main water flow which draws them to the white water discharge of the hydroelectric generators, etc., rather than to the installations designed to allow the fish to circumvent these obstacles. Accordingly, the preferred embodiment acts to reduce the distractions caused by water discharge techniques presently used by providing a low pressure discharge system and a fish ladder which uses a dominant water flow and hence is more attractive to the fish.

Also, when water is diverted from a waterway, e.g., to an irrigation canal or to a pumping station, it is desirable to screen or prevent fish from entering these unnatural paths. Therefore, the screening system of the preferred embodiment allows for a significant portion of water to be diverted from the waterway without altering the natural flow pattern of the waterway. The fish are not removed from the waterway and thus are not destroyed by the pumping equipment, nor are they pumped into irrigation canals where they will die.

BRIEF DESCRIPTION OF THE DRAWINGS

FIG. 3a is a top view and FIG. 3b is a side view of the fish ladder of the preferred embodiment.

DESCRIPTION OF THE PREFERRED EMBODIMENT

Figure 1:
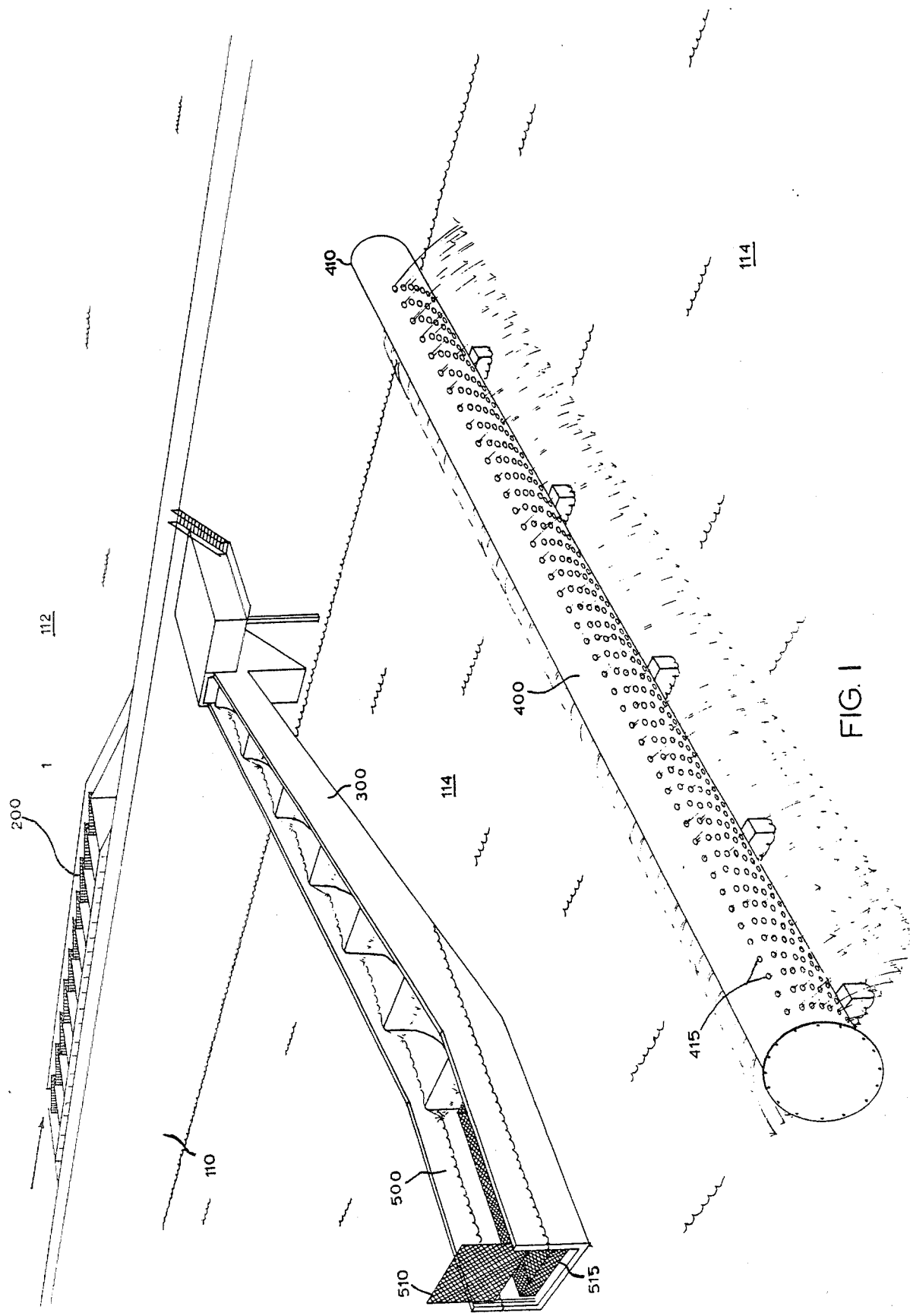
FIG. 1 is an overview of the system of the preferred embodiment.

An overview of a system in accordance with the preferred embodiment is shown in FIG. 1. This would be a typical installation at a dam 110 separating an upper body of water 112 and a lower body of water 114. Primary water flow is from the upper body of water 112 to the lower body of water 114. A multi-point discharger 400 is the primary water path. Also, some water and all the fish are guided down fish ladder 300.

An object of the preferred embodiment is to provide a pathway for fish to move between the two bodies of water via fish ladder 300. The downstream fish are directed to fish ladder 300 by a structure which is discussed more fully infra and which comprises a repetitive traveling screen 200. Screen 200 prevents fish from passing therethrough, but freely allows the passage of water.

The water which passes through screen 200 may be coupled to canal 114 through discharger 410, or in other installations, it could be used to drive a power generator and then discharged through a discharger such as discharger 410. Thus, the water resources may be tapped without trapping fish in irrigation canals or having them destroyed by being passed through a turbine.

Also shown in FIG. 1 is the predator seine 500. Seine 500 is operated to remove predator fish from the waters while not destroying the desirable fish. Basically, the grate 515 is lowered and the unwanted predator fish are chummed into a chamber formed by the lower portion of fish ladder 300 and the seine gate 510. The seine grate 515 is then raised and the predator fish can be destroyed. The mesh size is large enough to allow the fry or fingerlings to easily pass through. Once the seine is raised, the fish can be quickly and appropriately sorted. This is discussed more fully with respect to FIGS. 4a, 4b and 4c.

The water received from water body 112 through screen 200 is coupled to multi-point discharger 400 at its end point 410. Note that discharger 400 can be positioned above or below the water surface. As one alternative and for ease of illustration, it is shown above the surface in FIG. 1. It is then dispersed either under or over the surface of water body 114 through numerous small openings 415. In the preferred embodiment, the openings are between ½" and 1" in diameter. The flow rate of the emitted water is determined by the relative levels of the two bodies of water 112 and 114, as well as the size and number of openings 415 in discharger 400. The number and size of openings 415 are selected so that the desirable discharge rate can be maintained without creating a significant stimulus or turbulence in the surface of water body 114 which would confuse or misdirect the upwardly migrating fish which one wishes to direct to fish ladder 300. It should be noted that the less effort and energy that migrating fish are required to expend to find a suitable path to traverse the distance between the two bodies of water, the greater the survival rate of the migrating fish until mating, and hence the greater the number of progeny which will be produced.

Figure 2:
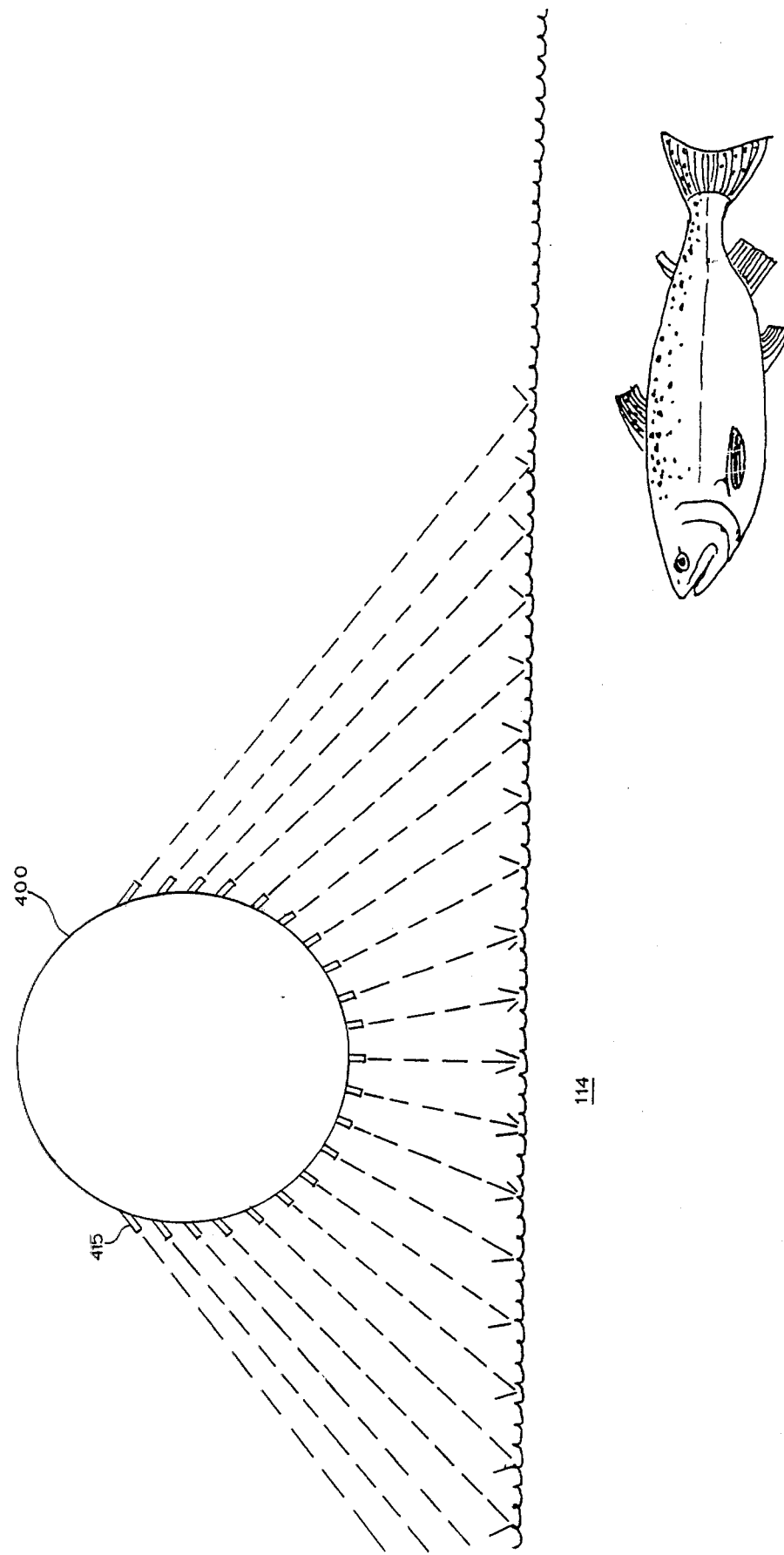
FIG. 2 is an end view of the multi-point discharger of the preferred embodiment.

An end view of discharger 400 is shown in FIG. 2. Note that nozzles 418 are added in this embodiment. The object is to create an effect similar to heavy rain, rather than a major attractant flow for which the fish is instinctively searching. The effect of the prior art discharge methods was to cause the fish to attempt to scale the front of the dam or point of discharge, rather than using the special fish ladders, since the fish instinctively regard the greater turbulence as leading the way to the largest and easiest path upstream. Hence, the low pressure dispersion of water from discharger 400 minimizes this problem. Again, discharger 400 may also be placed below the water surface.

Referring now to FIGS. 3a and 3b, there is shown a top view and a side view respectively of the fish ladder of the preferred embodiment. This comprises a series of dishlike compartments 151 to 156. Fish ladder 300 is designed to attract the fish to it through presenting a more dominant flow of water than the main discharge. This objective is most easily achieved by using the fish ladder along with a non-directional discharge scheme, such as discharger 400 of the preferred embodiment. Hence, the effectiveness of the fish ladder is enhanced by its use with discharger 400.

The water flow down ladder 300 may be increased or decreased by varying the quantity of water input at the top 108. Also, water is input via channels 103 to create the desired turbulence in each step or dish of the ladder and to increase the total water flow.

The turbulence created is useful for clearing debris from the ladder. Also, the reverse flow and the turbulence thus created complete the conditions the fish instinctively look for in a desirable path upstream. The reverse flow down the ladder via path 119 is just one of the flow patterns present. There is also a reverse water flow pattern within each compartment as indicated by arrows 109. This flow pattern is created and controlled by the amount of water input via input jets 103. Also, the amount of turbulence and volume of flowing water may be adjusted to not only aid one species in moving up the ladder, but also to prevent an unwanted species from using the ladder, under the control and discretion of the biologist in charge.

Since it is desirable to monitor number and types of fish going up and down the ladder, an observation window 107 is provided at the monitoring station 106. The passing fish can be monitored in person or via a remote television installation. Note that the power seine 500 is in the lower position in FIG. 3b.

Figure 4A:
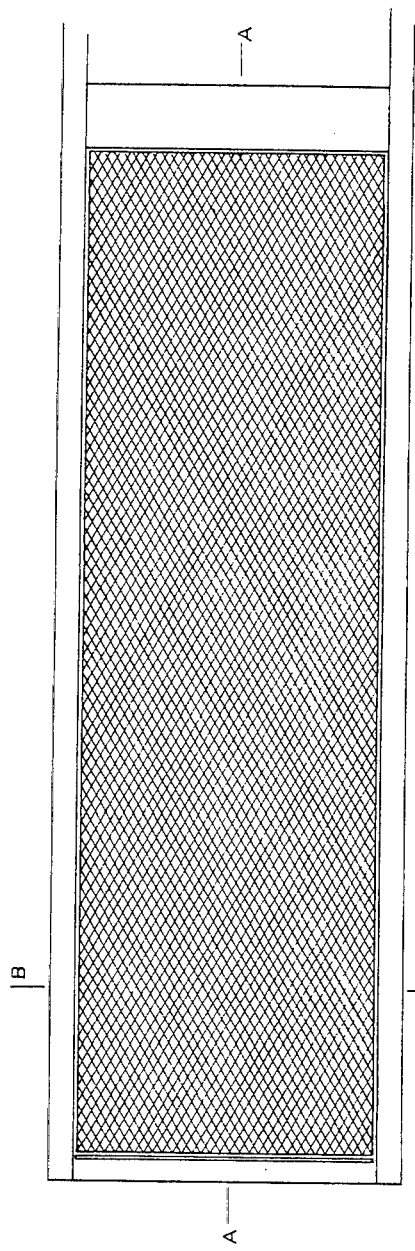
FIG. 4a is a top view.
Figure 4C:
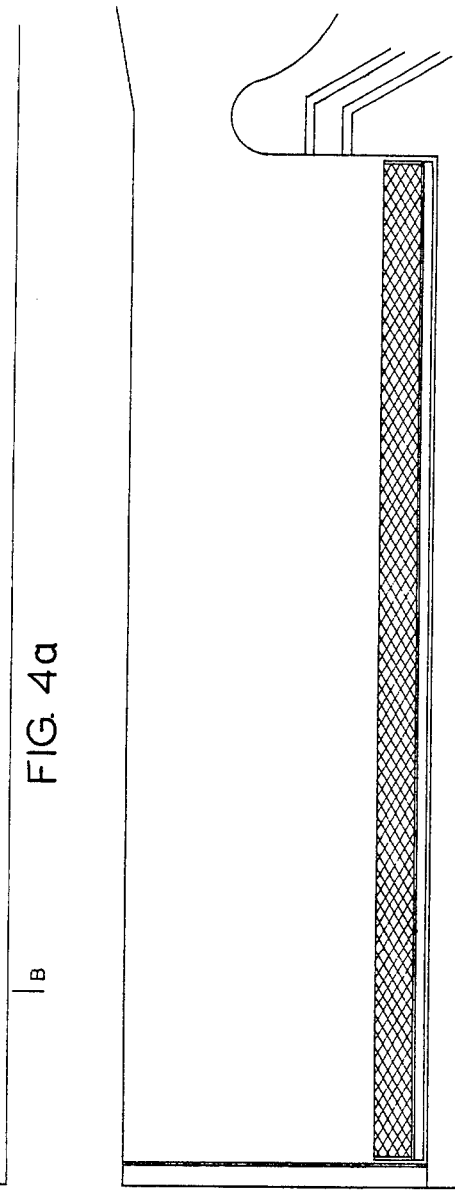
FIG. 4c is a side view of the predator seine of the preferred embodiment.
Figure 4B:
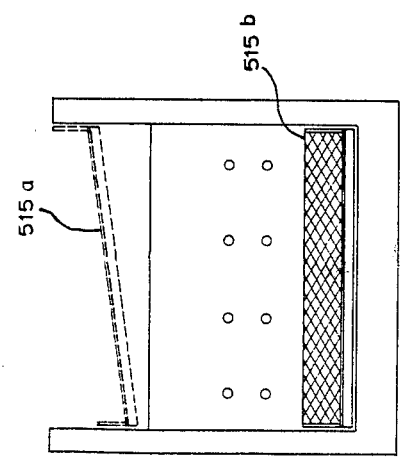
FIG. 4b is an end view.

Referring now to FIGS. 4a, 4b and 4c, there is shown the power seine of the preferred embodiment. Grate 515 is shown in the lowered position in the end view of FIG. 4b. At this point, unwanted predator fish can be chummed into the chamber through the use of bait. When predator fish have entered the chamber, the seine is raised from position 515b to 515a. The fish may then be sorted and the unwanted fish can be removed.

Figure 5:
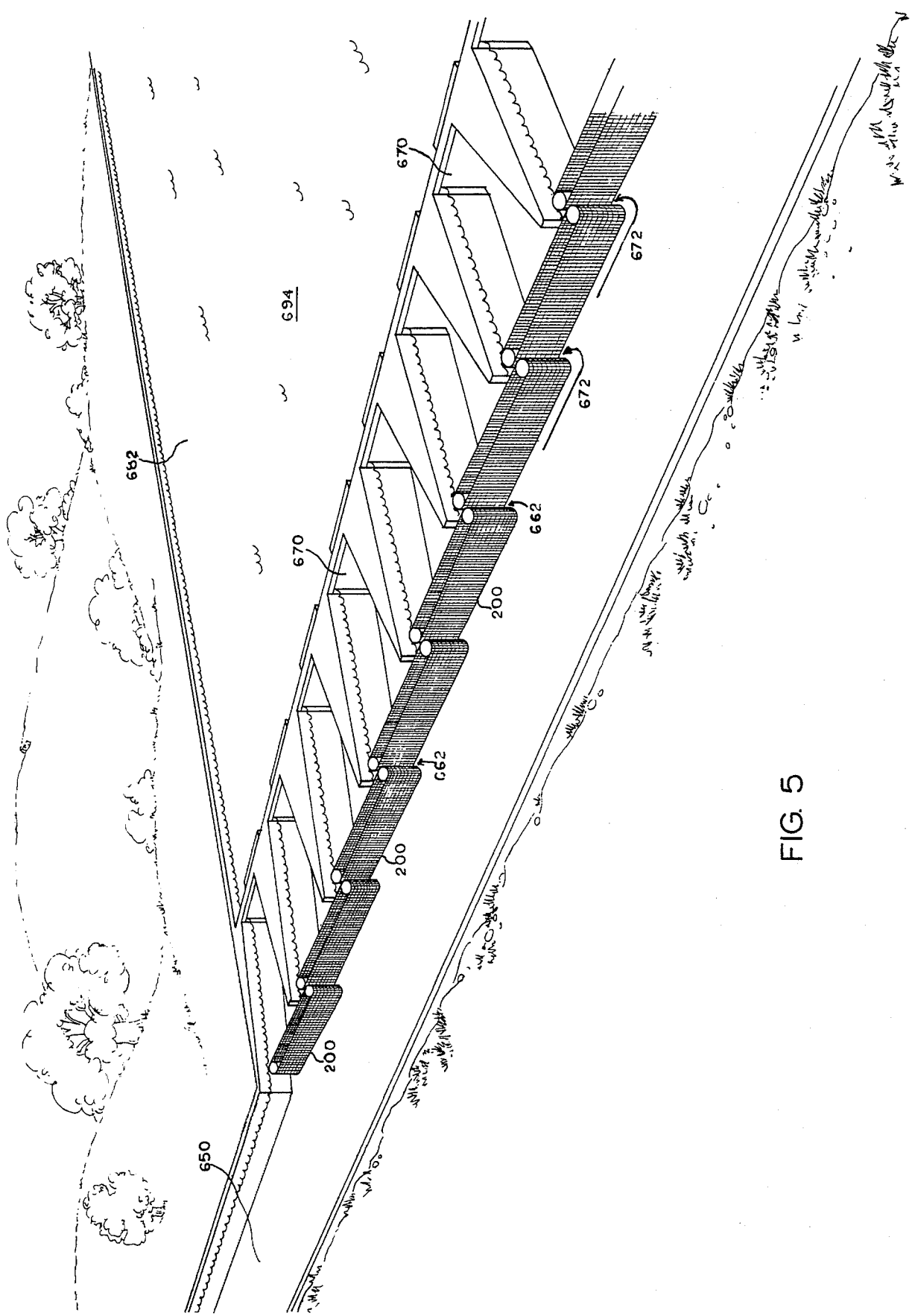
FIG. 5 is an installation of repetitive traveling screen of the preferred embodiment in use to divert water from a waterway.

Referring to FIG. 5 there is shown an installation of the repetitively traveling screen of the preferred embodiment. The screen's main objective is to prevent downstream fish migrants from being lost into canal systems. The water source enters the screening area at point 650. The traveling screens 200 are installed in overlapping fashion in front of gate valves 670. Gate valves 670 regulate the amount of water flowing from water body 680 into water body 682. A desilting pond area 694 is provided to allow suspended sediments to settle out. The traveling screens 200 are rotated in the direction indicated by arrow 672 at a predetermined speed. Also, water is injected at the points between the screens, i.e., points 662 to create a flushing action which prevents small fish from passing through the space between the screens. The strength of these counter flows can be adjusted. The preferred embodiment uses screen material of approximately 5/32" in diameter. This is an effective balance between the need for small openings to prevent small fish from passing through and the need to maximize the area of the opening with respect to that of the screen material to offer the minimum resistance to the flowing water.

Figure 6:
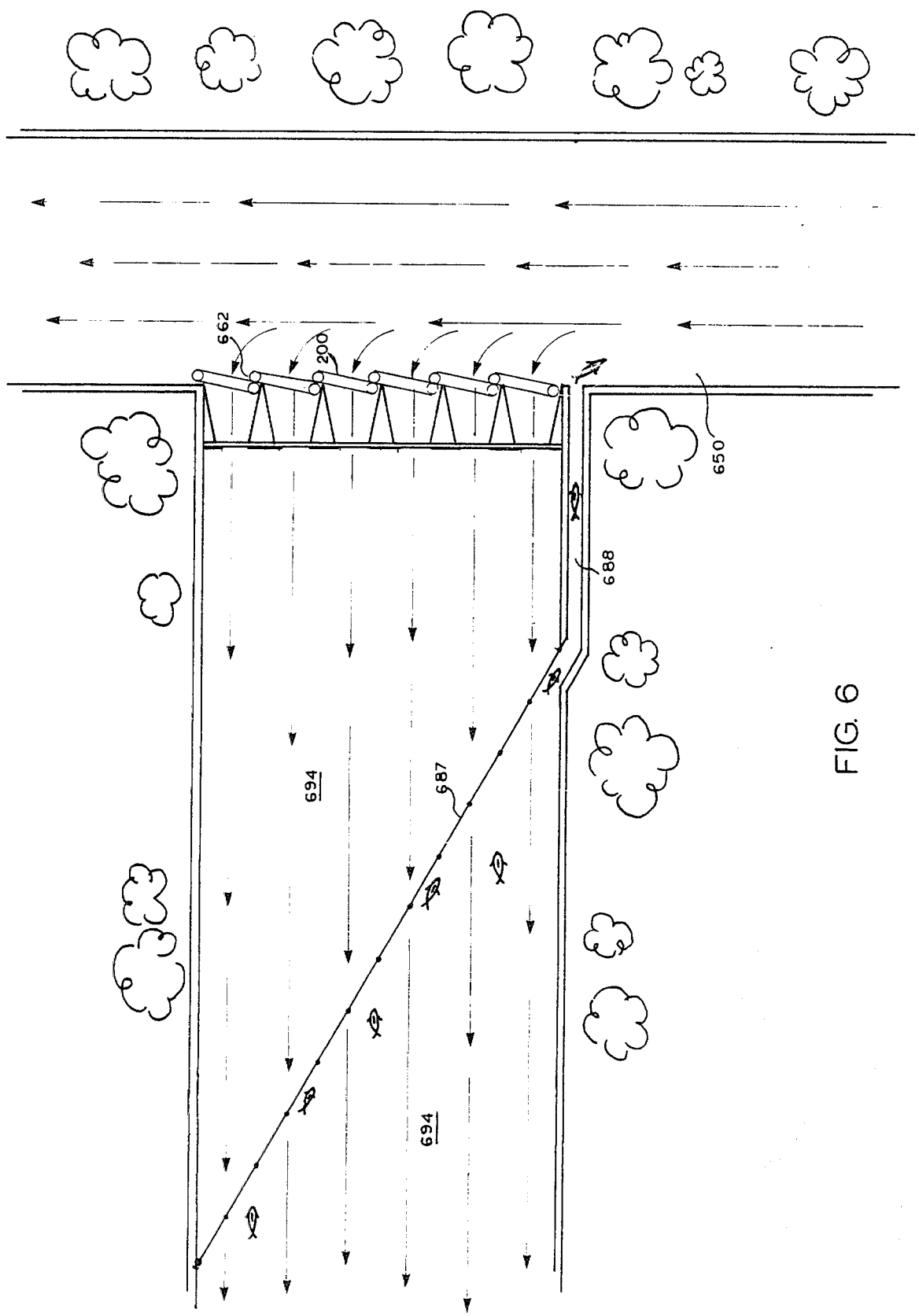
FIG. 6 is a top view of a traveling screen installation in accordance with an embodiment of the invention. Also, an optional fish return is shown.

FIG. 6 shows a top view of the rotating screen installation. Also, it shows additional structure which is only necessary in the unusual situation that water from river 650 is being discharged through canal 694 into a second river which also contains upstream migrants. These upstream migrants presumably had become confused and proceeded up the second river, following the flow of water from river 650 which was input to the second river via connecting canal 694, rather than continuing upstream in river 650 on the path to their home water. These fish need to be guided upstream past the rotating screen and allowed to continue their upstream migration in river 650. Thus, these upward migrating fish which reach canal 694 are guided by barrier 687 into channel 688.

Also, note that with the angle of attack, i.e., the angular placement of screen 200 with respect to the water flow in river 650, an advantage of a system in accordance with the preferred embodiment is that the fish are never driven directly onto the screen surface by the primary water flow. In addition, the water flow down river 650 can be increased to such a point that the fish are inhibited from swimming sideways and attempting to enter canal 682 by the velocity and momentum of the moving water. In the preferred embodiment, the fish are not directed toward and impinged upon a screen barrier which is perpendicular to the water flow, as was the case in prior installations. Rather, the screen is designed such that there is little chance of the fish contacting the screen. Also, the use of increased water velocities in the preferred embodiment actually decreases the chance of the fish contacting the screen. This is in contrast to the prior techniques wherein the screen material was perpendicular to the water flow and wherein the fish, to escape being thrown directly against the screen material, had to be strong enough to swim upstream away from the screen material. Since a system in accordance with the preferred embodiment is not in the path of primary water flow, i.e., it is at most a deflection, rather than a barrier, the screen can be constructed from a much lighter gauge material.

Figure 7:
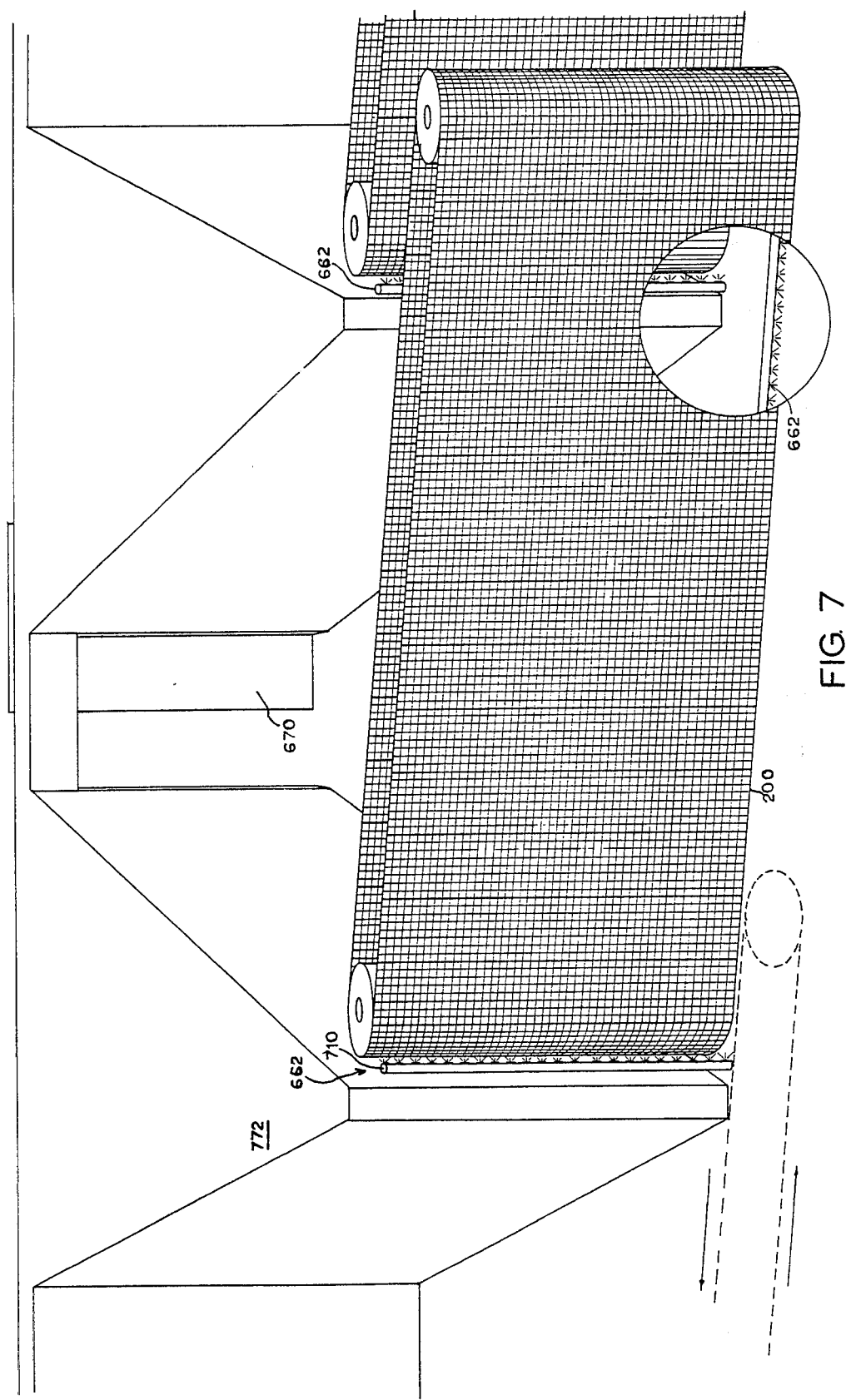
FIG. 7 is a top view of an installation of one traveling screen in accordance with the preferred embodiment.

Referring now to FIG. 7, the rotating screen of the preferred embodiment 200 is shown in position in front of gate valve 670. Note that water curtains are provided by the input at point 662 through the use of water jet assembly 710. These water curtains are used to further inhibit any small fish from attempting to pass through the small openings at point 662 between the abutment 772 and screen 200.

I claim:

1. Apparatus for providing a pathway for migrating fish between a lower body of water and an upper body of water, said apparatus comprising a plurality of compartment means having rounded bottoms for holding a preselected volume of water, said plurality of compartment means being coupled one to another in a ladderlike arrangement from a last compartment means at a lowest level to a first compartment means at a highest level, said plurality of compartment means comprising overflow means for allowing water in said compartment means to overflow therethrough whenever the water therein reaches a predetermined level, each of said plurality of compartment means between said first and last compartment means being coupled to receive water through the overflow means from the compartment means preceding it and to provide water through said overflow means to the compartment means succeeding it; and an inlet means being coupled to at least one of said plurality of compartment means for providing a preselected flow of water into at least one of said plurality of compartment means, thereby providing a preselected amount of water flow within said compartment means and also providing a preselected amount of turbulence for cleaning debris from said compartment means.

2. The apparatus as in claim 1 wherein said last compartment at said lowest level is coupled to a seine means which is substantially an enclosure formed by a plurality of sides and a bottom, said bottom being movable between a first level and a second level within said enclosure, said seine means being useful for removing undesirable fish from said body of water by placing bait on said bottom at a first time and raising said bottom at a later time when said undesirable fish are present.

3. The apparatus as in claim 1 wherein said inlet means is coupled to each of said compartment means for providing a preselected flow of water thereto and for causing a predetermined amount of circulating fluid flow and turbulence therein.

4. The apparatus as in claim 3 wherein said last compartment at said lowest level is coupled to a seine means which is substantially an enclosure formed by a plurality of sides and a bottom, said bottom being movable between a first level and a second level within said enclosure, said seine means being useful for removing undesirable fish from said body of water by placing bait on said bottom at a first time and raising said bottom at a later time when said undesirable fish are present.

5. The apparatus as in claim 4 wherein one of said walls of said enclosure includes a gate which may be opened and closed to allow and prevent, respectively, fish from entering into and exiting from said enclosure.

6. A system for use in removing water from a first body of water while not removing or damaging fish and other water life therein, said system comprising:
   a first means for containing flowing water of said first body of water and having a water flow at a first portion thereof occurring substantially along a first line;
   a second means coupled to said first means at said first portion for containing flowing water having a water flow occurring substantially along a second line, said second line being substantially orthogonal to said first line; and
   a screen means coupled to said first means and said second means comprising a meshlike material of a preselected size for allowing water to flow therethrough and for preventing a predetermined size of fish and other water life from passing therethrough, said meshlike material being interposed between said first means and said second means, the plane formed by said meshlike material being essentially perpendicular to the water flow in said second means.

7. The system as in claim 6 and further comprising a gate means coupled to said screen means and said second means for varying the amount of water flowing from said first means into said second means in response to operator manifestations indicating a desired flow rate of water from said first means into said second means.

8. The system as in claim 6 wherein said meshlike material is joined together in a loop, and said screen means further comprises first and second rotating means positioned at opposite ends of said loop of meshlike material for causing said loop of meshlike material to move through the water in a predetermined direction.

9. The system as in claim 8 and further comprising a gate means coupled to said screen means and said second means for varying the amount of water flowing from said first means into said second means in response to operator manifestations indicating a desired flow rate of water from said first means into said second means.

10. The system as in claim 8 and further comprising a guide means disposed laterally across said second means for guiding fish to a first preselected point; and return means coupled to said first and second means for allowing fish at said first preselected point to transverse from said first preselected point in the flowing water contained by said second means to the flowing water contained by said first means.

11. The system as in claim 9 wherein said gate means is positioned between a first and second abutment having first and second projections respectively which extend outwardly into the water within said first means, the water in said first means generally flowing from a relative position upstream from said first projection of said first abutment to a relative position downstream from said second projection of said second abutment, said first projection being interposed between said first rotating means and the water flow within said first means.

12. The system as in claim 10 wherein an opening is present between said first projection and said first rotating means and said system further comprises hydraulic means having a plurality of nozzles for providing a curtain of water flow between said first projection and the portion of the loop of meshlike material about said first rotating means.

* * * * *